(12) United States Patent
Lee et al.

(10) Patent No.: US 11,949,127 B2
(45) Date of Patent: Apr. 2, 2024

(54) BATTERY INCLUDING ADHESIVE LAYER FORMED ON EXTENDED REGION OF SEPARATOR OF ELECTRODE ASSEMBLY, AND ELECTRONIC DEVICE COMPRISING SAME

(71) Applicant: Samsung Electronics Co., Ltd., Gyeonggi-do (KR)

(72) Inventors: Jaeyeon Lee, Gyeonggi-do (KR); Kwanghoon Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 17/312,452

(22) PCT Filed: Jan. 20, 2020

(86) PCT No.: PCT/KR2020/000919
§ 371 (c)(1),
(2) Date: Jun. 10, 2021

(87) PCT Pub. No.: WO2020/153683
PCT Pub. Date: Jul. 30, 2020

(65) Prior Publication Data
US 2022/0059909 A1    Feb. 24, 2022

(30) Foreign Application Priority Data
Jan. 21, 2019    (KR) .................. 10-2019-0007545

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 50/105* (2021.01);
(Continued)

(58) Field of Classification Search
CPC ............ H01M 50/538; H01M 50/105; H01M 50/409; H01M 50/461; H01M 50/116;
(Continued)

(56) References Cited

U.S. PATENT DOCUMENTS 4,963,445 A  * 10/1990 Marple ................. H01M 6/10
429/211
9,246,185 B2    1/2016 Kretschmar et al.
(Continued)

FOREIGN PATENT DOCUMENTS

EP    3048656 A1 *  7/2016
EP    3244475 A1   11/2017
(Continued)

OTHER PUBLICATIONS

European Search Report dated Jan. 12, 2022.
(Continued)

*Primary Examiner* — Matthew T Martin
*Assistant Examiner* — Adam J Francis
(74) *Attorney, Agent, or Firm* — Cha & Reiter, LLC

(57) ABSTRACT

Disclosed is a battery. A battery according to various embodiments is characterized by comprising: a cathode including a cathode tab formed at one end; an anode disposed on one surface of the cathode and including an anode tab formed at one end; an electrode assembly including a first separator disposed between the cathode and the anode and separating the cathode from the anode, and a second separator having one surface disposed on the other surface of the cathode or the anode and including an extended portion extending from the other end of the cathode or the anode; and a pouch surrounding the electrode assembly, wherein the cathode, the anode, the first separator, and the second separator are wound so that the extended portion of the first separator is exposed to the outside, and (Continued)

an exposed surface of the extended portion is formed as an adhesive layer.

14 Claims, 12 Drawing Sheets

(51) Int. Cl.
*H01M 10/0587* (2010.01)
*H01M 50/105* (2021.01)
*H01M 50/409* (2021.01)
*H01M 50/46* (2021.01)
*H04M 1/02* (2006.01)

(52) U.S. Cl.
CPC ....... *H01M 50/409* (2021.01); *H01M 50/461* (2021.01); *H04M 1/0262* (2013.01); *H01M 10/0587* (2013.01); *H01M 2220/30* (2013.01)

(58) Field of Classification Search
CPC ............. H01M 50/466; H01M 50/449; H01M 50/107; H01M 10/0431; H01M 10/0587; H01M 10/04; H01M 2220/30; H04M 1/0262
See application file for complete search history.

(56) References Cited

U.S. PATENT DOCUMENTS

| | | | | |
|---|---|---|---|---|
| 2003/0180605 A1* | 9/2003 | Mizutani | ............. | H01M 10/052 429/211 |
| 2015/0062844 A1* | 3/2015 | Bae | .................... | H04M 1/0249 361/752 |
| 2015/0207179 A1 | 7/2015 | Bao et al. | | |
| 2015/0214527 A1* | 7/2015 | Park | .................... | H01M 50/531 429/94 |
| 2016/0218386 A1* | 7/2016 | Park | .................... | H01M 50/121 |
| 2017/0141427 A1* | 5/2017 | Cho | .................... | H01M 4/0404 |
| 2018/0034028 A1* | 2/2018 | Jung | ................. | H01M 10/0431 |
| 2018/0083311 A1 | 3/2018 | Kim et al. | | |
| 2018/0175455 A1 | 6/2018 | Bao et al. | | |
| 2019/0229361 A1 | 7/2019 | Kim et al. | | |

FOREIGN PATENT DOCUMENTS

| | | | |
|---|---|---|---|
| JP | 08273698 A | | 10/1996 |
| JP | 08306366 A | | 11/1996 |
| JP | H08306366 | * | 11/1996 |
| KR | 10-2001-0077594 A | | 8/2001 |
| KR | 10-2007-0108578 A | | 11/2007 |
| KR | 10-2011-0054312 A | | 5/2011 |
| KR | 10-2016-0015769 A | | 2/2016 |
| KR | 10-2017-0027497 A | | 3/2017 |
| KR | 10-2017-0027677 A | | 3/2017 |
| KR | 20170027497 A | * | 3/2017 |
| KR | 10-2018-0032019 A | | 3/2018 |
| KR | 10-2018-0037748 A | | 4/2018 |
| KR | 10-2019-0114122 A | | 10/2019 |

OTHER PUBLICATIONS

Indian Office Action dated Feb. 1, 2023.
Chinese Office Action dated Feb. 5, 2024.
Korean Office Action dated Feb. 5, 2024.

* cited by examiner

BATTERY INCLUDING ADHESIVE LAYER FORMED ON EXTENDED REGION OF SEPARATOR OF ELECTRODE ASSEMBLY, AND ELECTRONIC DEVICE COMPRISING SAME

CROSS REFERENCE TO RELATED APPLICATIONS

This application is a National Phase Entry of PCT International Application No. PCT/KR2020/000919, which was filed on Jan. 20, 2020, and claims a priority to Korean Patent Application No. 10-2019-0007545, which was filed on Jan. 21, 2019, the contents of which are incorporated herein by reference.

TECHNICAL FIELD

Various embodiments relate to a battery including an adhesive layer provided on an extension region of a separator of an electrode assembly, and an electronic device including the same.

BACKGROUND ART

A secondary battery (e.g., a lithium ion battery or a lithium polymer battery) may be a power storage device having a high energy density capable of storing electrical energy in the form of chemical energy.

In a configuration, a secondary battery may include an electrode assembly including a positive electrode, a negative electrode, or a separator, and the electrode assembly may be made by winding or repeatedly stacking components, each of which is fabricated as a thin film, and a finishing tape may be used on the outer surface of the electrode assembly in order to fix the wound or stacked electrode assembly.

A separate adhesive member may be used in order to fix the electrode assembly inside the pouch. For example, the adhesive member may have a bonding force between the pouch and the electrode assembly by applying a tape or a binder.

DISCLOSURE OF INVENTION

Technical Problem

In order to reduce the thickness of an electronic device, the battery of the electronic device may be miniaturized. The battery may be insulated from the outside by being coupled with a pouch. When a separate adhesive member is used for adhesion between an electrode assembly and a pouch, the capacity of the battery may decrease or the thickness may increase depending on the thickness of the adhesive member.

Due to the variation in the thickness of each member of the electrode assembly, it may be difficult to secure an attachment area of the adhesive member. When an external impact, such as dropping, is caused due to the occurrence of slip at the boundary between an attached surface and a non-attached surface, a positive pole substrate may be torn or internal short circuit may occur due to the tearing.

The electrode assembly of the battery may be moved due to dropping of the electronic device or an external impact applied to the electronic device, and the battery may be damaged according to the movement of the electrode assembly. In order to prevent the movement of the electrode assembly, an adhesive member may be provided for adhesion between the electrode assembly and the pouch, but the thickness of the battery may increase or the capacity of the battery may decrease due to the thickness of the adhesive member.

Various embodiments are capable of providing a battery including an adhesive layer provided on an extension region of a separator of an electrode assembly in which the electrode assembly is capable of being coupled to a pouch using a component of the electrode assembly, and an electronic device including the same.

Solution to Problem

A battery according to various embodiments may include: an electrode assembly including a positive electrode including a positive electrode tab provided at one end, a negative electrode disposed on one surface of the positive electrode and including a negative electrode tab provided at one end, a first separator disposed between the positive electrode and the negative electrode to separate the positive electrode from the negative electrode and including an extension extending from another end of the positive electrode or the negative electrode, and a second separator having one surface disposed on another surface of the positive electrode or the negative electrode; and a pouch wrapping the electrode assembly. The positive electrode, the negative electrode, the first separator, and the second separator may be wound so that the extension of the first separator is exposed to the outside, and an exposed surface of the extension may be configured as an adhesive layer.

An electronic device according to various embodiments may include: a housing defining an inner space therein; an electrode assembly including: a battery including a positive electrode including a positive electrode tab provided at one end, a negative electrode disposed on one surface of the positive electrode and including a negative electrode tab provided at one end, a first separator disposed between the positive electrode and the negative electrode to separate the positive electrode from the negative electrode and including an extension extending from another end of the positive electrode or the negative electrode, and a second separator having one surface disposed on another surface of the positive electrode or the negative electrode; and a pouch wrapping the electrode assembly, the battery being disposed in the inner space; and a bracket on which the battery is seated. The positive electrode, the negative electrode, the first separator, and the second separator may be wound so that the extension of the first separator is in contact with an inner surface of the pouch, and the first separator may be fixed to the pouch by an adhesive layer provided on an exposed surface of the extension.

Advantageous Effects of Invention

A battery including an adhesive layer provided in an extension region of a separator of an electrode assembly according to an embodiment of the disclosure and an electronic device including the same are capable of preventing damage to the electrode assembly of the battery due to an external impact caused by dropping or the like.

Instead of a finishing tape or an adhesive member for finishing the electrode assembly, the separator of the electrode assembly is extended to form the outermost surface of the electrode assembly. Thus, it is possible to reduce the overall volume, and is easy to secure a predetermined battery capacity compared to a conventional battery having the same volume.

In addition, since it is possible to maintain the adhesion force between the pouch and the electrode assembly uniformly, it is possible to prevent the occurrence of slip at the interface between the pouch and the electrode assembly.

BEST MODE FOR CARRYING OUT THE INVENTION

Hereinafter, embodiments of the disclosure will be described with reference to the accompanying drawings.

Figure 1:
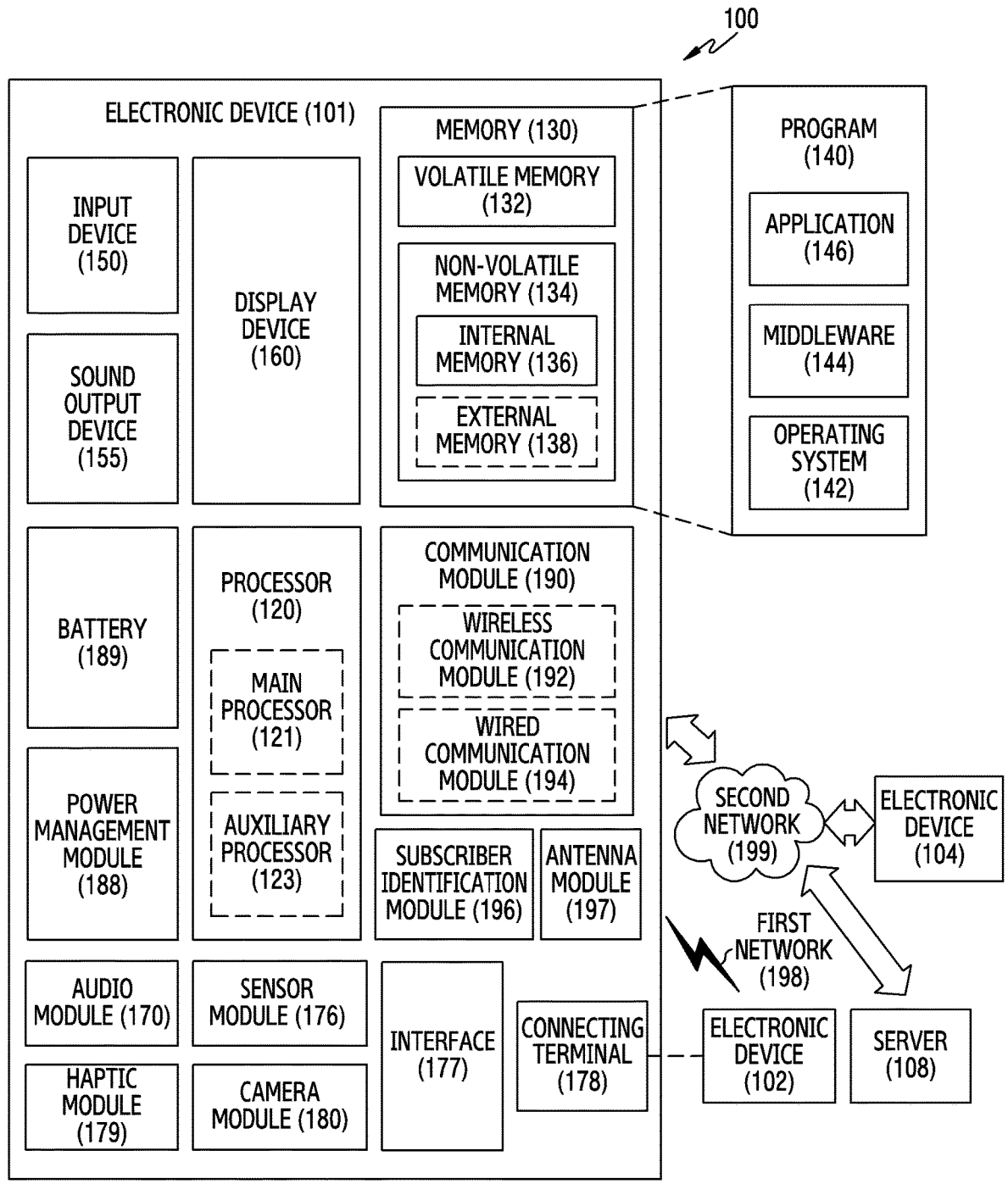
FIG. 1 is a block diagram of an electronic device according to various embodiments in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
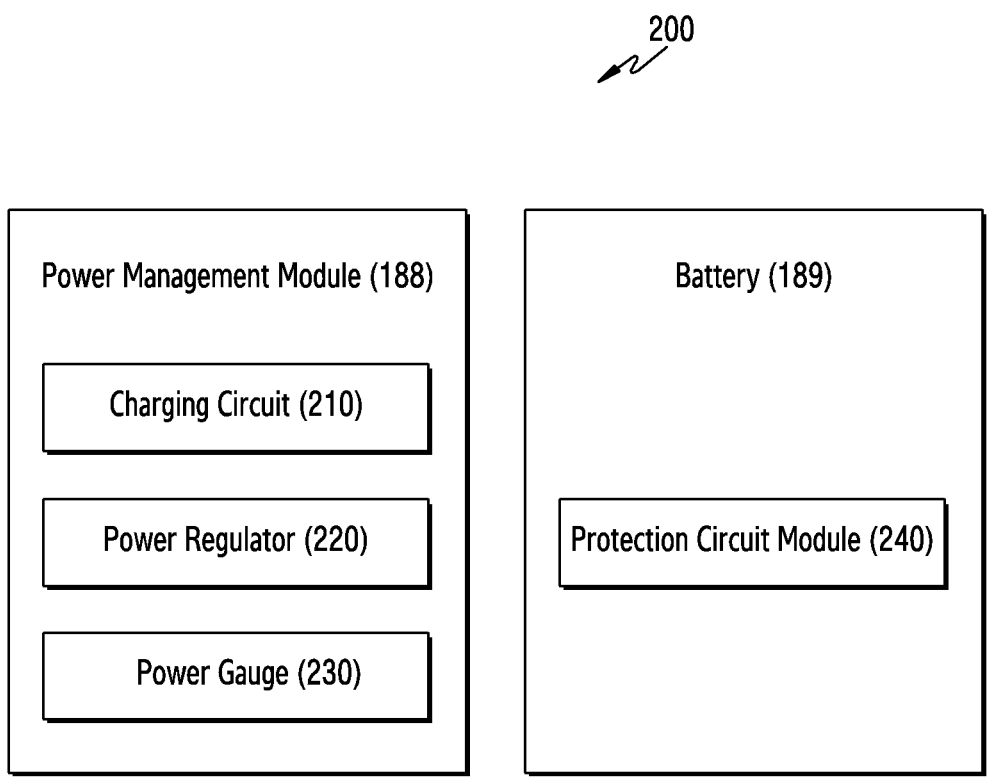
FIG. 2 is a block diagram illustrating a power management module and a battery according to various embodiments.

FIG. 2 is a block diagram 200 illustrating a power management module 188 and a battery 189 according to various embodiments. Referring to FIG. 2, a power management module 188 may include a charging circuit 210, a power regulator 220, or a power gauge 230. The charging circuit 210 may charge a battery 189 using power supplied from an external power source for the electronic device 101. According to an embodiment, the charging circuit 210 may select a charging method (e.g., normal charging or quick charging) based on at least some of the type of an external power source (e.g., a power adapter, a USB, or wireless charging), the magnitude of power capable of being supplied from the external power source (e.g., about 20 watts or more), or the attribute of the battery 189, and may charge the battery 189 using the selected charging method. The external power source may be connected with the electronic device 101, for example, in a wired manner via a connection terminal 178 or in a wireless manner via an antenna module 197.

The power regulator 220 may generate multiple kinds of power having different voltages or different current levels by adjusting the voltage level or the current level of the power supplied from, for example, the external power source or the battery 189. The power regulator 220 may regulate the power from the external power source or the battery 189 to a voltage or current level suitable for each of some components among the components included in the electronic device 101. According to an embodiment, the power regulator 220 may be implemented as a low-drop-out (LDO) regulator or a switching regulator. The power gauge 230 may measure the use state information of the battery 189 (e.g., the capacity, the charging/discharging frequency, the voltage, or the temperature of the battery 189).

The power management module 188 may determine charging state information (e.g., life, overvoltage, undervoltage, overcurrent, overcharge, over discharge, overheat, short circuit, or swelling) associated with the charging of the battery 189 at least partially based on the measured use state information using, for example, the charging circuit 210, the power regulator 220, or the power gauge 230. The power management module 188 may determine whether the battery 189 is abnormal or normal at least partially based on the determined charging state information. When it is determined that the state of the battery 189 is abnormal, the power management module 188 may regulate the charging of the battery 189 (e.g., reducing the charging current or voltage, or stopping the charging). According to an embodiment, at least some of the functions of the power management module 188 may be performed by an external control device (e.g., the processor 120).

According to an embodiment, the battery 189 may include a battery protection circuit module (PCM) 240. The battery protection circuit module 240 may perform one or more of various functions (e.g., a pre-blocking function) for preventing performance degradation or burnout of the battery 189. The battery protection circuit module 240 may be configured in addition to, or as an alternative to, at least a part of a battery management system (BMS) for performing various functions including cell balancing, battery capacity measurement, charging/discharging frequency measurement, temperature measurement, or voltage measurement.

According to an embodiment, at least a part of the use state information or the charging state information of the battery 189 may be measured using a corresponding sensor (e.g., a temperature sensor) of the sensor module 276, a power gauge 230, or the power management module 188. According to an embodiment, the corresponding sensor (e.g., a temperature sensor) of the sensor module 176 may be included as a part of the battery protection circuit 140, or may be disposed in the vicinity of the battery 189 as a separate device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 3:
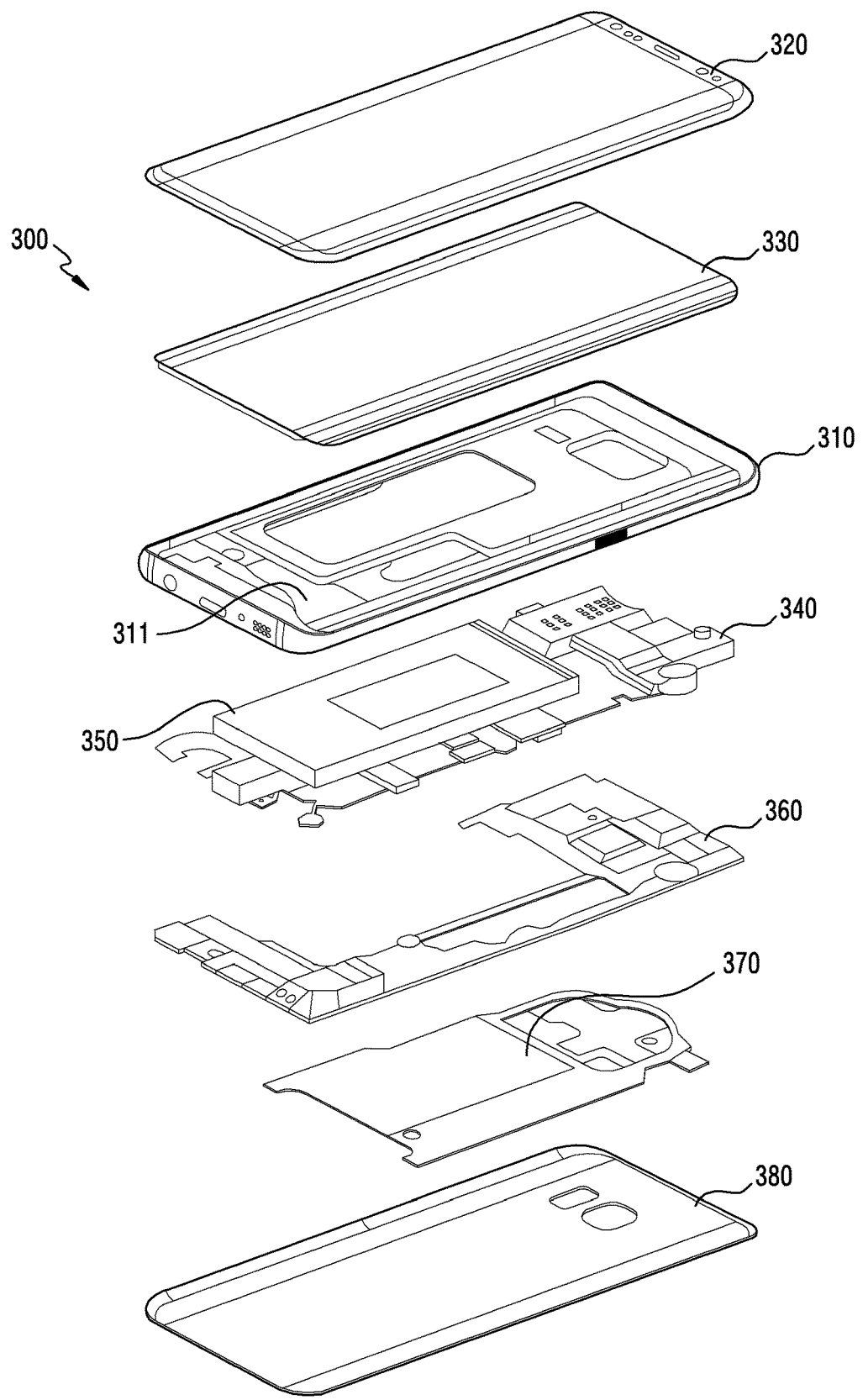
FIG. 3 is an exploded perspective view of an electronic device including a battery according to an embodiment.

FIG. 3 is an exploded perspective view of an electronic device including a battery according to an embodiment.

Referring to FIG. 3, the electronic device 300 may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. At least one (e.g., the first support member 311 or the second support member 360) of the elements may be omitted from the electronic device 300 or another element may be additionally included in the electronic device 300.

According to an embodiment, an electronic device 300 may include a housing 320, 380, 310 including a front surface (not illustrated), a rear surface (not illustrated), and a side surface (not illustrated) wrapping the space between the front surface and the rear surface. In another embodiment (not illustrated), the term "housing" may refer to a structure defining some of the front surface, the rear surface, and the side surface. According to an embodiment, at least a portion of the front surface may be defined by a substantially transparent front plate 320 (e.g., a glass plate or a polymer plate including various coating layers). The rear surface may be defined by a substantially opaque rear plate 380. The rear plate 380 may be made of, for example, coated or colored glass, ceramic, a polymer, a metal (e.g., aluminum, stainless steel (STS), or magnesium), or a combination of two or more of these materials. The side surface may be defined by a side bezel structure (or a side member 310) coupled to the front plate 320 and the rear plate 380 and including a metal and/or a polymer. In some embodiments, the rear plate 380 and the side bezel structure 310 may be integrally configured, and may include the same material (e.g., a metal material such as aluminum).

The first support member 311 may be disposed in the interior of the wearable electronic device 300 to be connected to the side bezel structure 310 or to be integrally formed with the side bezel structure 310. The first support member 311, for example, may be formed of a metallic material and/or a nonmetallic material (e.g., a polymer). The display 330 may be coupled to one surface of the first support member 311, and the printed circuit board 340 may be coupled to an opposite surface of the first support member 311. A processor, a memory, and/or an interface may be mounted on the printed circuit board 340. The processor, for example, may include one or more of a central processing unit (CPU), an application processor (AP), a graphic processing unit (GPU), an image signal processor (ISP), a sensor hub process, or a communication processor (CP).

The memory, for example, may include a volatile and/or nonvolatile memory.

The interface, for example, may include a high definition multimedia interface (HDMI), a USB interface, a secure date (SD) card interface, and/or an audio interface. The interface, for example, may electrically or physically connect the electronic device 300 to an external electronic device, and may include a USB connector, an SD card/multimedia card (MMC) connector, and an audio connector.

The battery 350 is a device for supplying electrical power to at least one element of the electronic device 300, and, for example, may include a primary battery that cannot be recharged, a secondary battery that may be recharged, or a fuel cell. At least a portion of the battery 350, for example, may be disposed on substantially the same plane as the printed circuit board 340. The battery 350 may be integrally disposed in the interior of the electronic device 300, and may be disposed to be detachable from the electronic device 300.

The antenna 370 may be disposed between the rear plate 380 and the battery 350. The antenna 370, for example, may include a near field communication (NFC) antenna, a wireless charging antenna, and/or a magnetic secure transmission (MST) antenna. The antenna 370, for example, may perform short-range communication with an external device, or may wirelessly transmit and receive electrical power that is necessary for charging. An antenna structure may be formed by one or a combination of the side bezel structure 310 and/or the first support member 311.

Figure 4:
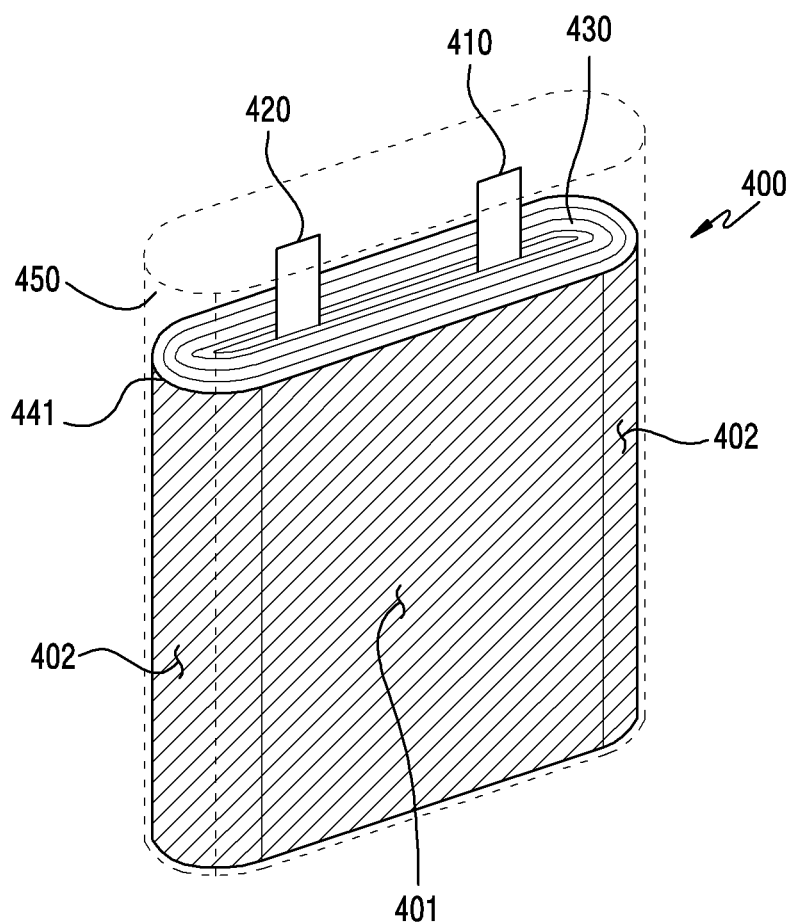
FIG. 4 is a schematic view illustrating the structure of the battery included in the electronic device of FIG. 3.

FIG. 4 is a schematic view illustrating the structure of a battery included in the electronic device of FIG. 3.

Referring to FIG. 4, a battery 400 (e.g., the battery 350 in FIG. 3) may further include a positive electrode tab 410, a negative electrode tab 420, an electrode assembly 430, or a pouch 450.

According to an embodiment, the pouch 450 may include an inner space in which the electrode assembly 430 is capable of being accommodated. The electrode assembly 430 may be formed in a structure in which a positive electrode, a negative electrode, and a separator are overlapped and wound. For example, the electrode assembly 430 may be formed in a jelly roll shape. A positive electrode tab 410 may be attached to one end of the positive electrode to be exposed to the outside, and a negative electrode tab 420 may be attached to one end of the negative electrode to be exposed to the outside. The positive electrode tab 410 and the negative electrode tab 420 may be located in the central portion of the electrode assembly. According to another embodiment, the electrode assembly may be formed in a stack-type structure in which positive electrodes and negative electrodes are alternately stacked with each other and a separator is disposed between each adjacent positive and negative electrodes. The positive electrodes may be configured integrally and bent every predetermined width, and the negative electrodes may also be formed in the same shape as the positive electrodes.

According to various embodiments, the outer surface of the electrode assembly 430 may include a flat surface 401 or a curved surface 402. For example, the electrode assembly 430 may include flat surfaces 401 as a whole, or may have curved surfaces 402 in some regions. The electrode assembly 430 may have a curved surface 402 as a whole depending on the winding method. For adhesion between the electrode assembly 430 and the pouch 450, the outer surface of the electrode assembly 430 may be provided with an adhesive layer 441. The adhesive layer 441 may surround the outer surface of the electrode assembly 430, and the adhesive layer 441 may have a uniform adhesion force between the electrode assembly 430 and the pouch 450. For example, the adhesive layer 441 may be provided on the entire outer surface of the electrode assembly 430, and the entire outer surface of the electrode assembly 430 may be adhered to the inner surface of the pouch 450. The electrode assembly 430 may be in close contact with the inner space of the pouch 450 and may be fixed within the pouch 450 so as not to move or shake.

Figure 5:
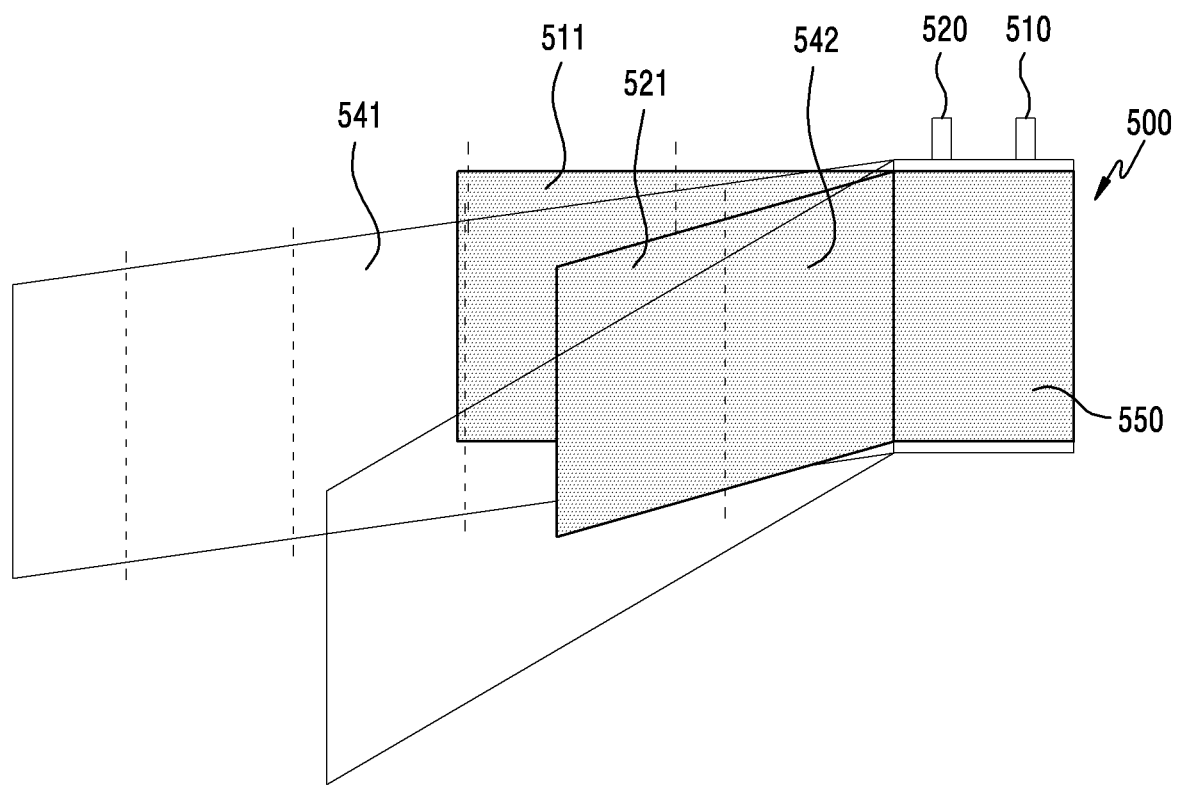
FIG. 5 is a development view of the battery of FIG. 4.

FIG. 5 is a development view of the battery of FIG. 4.

Referring to FIG. 5, an electrode assembly 500 may include a positive electrode 511, a negative electrode 521, a first separator 541, or a second separator 542. The positive electrode 511, the negative electrode 521, the first separator 541, and the second separator 542 may be overlapped and wound to form a winding structure 550. A first separator 541 disposed between the positive electrode 511 and the negative electrode 521 may be included, and a second separator 542 may be disposed on a surface of the negative electrode 521 opposite to the surface on which the first separator 541 is disposed. According to various embodiments, the second separator 542 may be disposed on a surface of the positive electrode opposite to the surface on which the first separator 541 is disposed.

According to various embodiments, the electrode assembly 500 may convert chemical energy of the positive electrode 511 and the negative electrode 521 into electrical energy. The electrode assembly 500 may supply power to a circuit (e.g., the power management module 188 in FIG. 2) mounted in an electronic device (e.g., the electronic device 101 in FIG. 1) via a positive electrode tab 510 connected to the positive electrode 511 and a negative electrode tab 520 connected to the negative electrode 521.

According to various embodiments, the positive electrode 511 may include a positive electrode substrate, a positive electrode active material coated on a surface of the positive electrode substrate, and a conductive agent. The positive electrode active material may include a material involved in the electrode reaction (e.g., NCM, NCA, LCO, etc.), and the conductive agent may be made of a material for improving conductivity.

According to an embodiment, the positive electrode substrate may be a plate or layer (e.g., an aluminum foil) including a metal such as aluminum, and the positive electrode active material may include lithium oxide.

According to various embodiments, the negative electrode 521 may include a negative electrode substrate, a negative electrode active material coated on a surface of the negative electrode substrate, and a conductive agent. The negative electrode substrate may be a plate or layer (e.g., a copper foil) including a metal such as copper, and the negative electrode active material may include a carbon material or a non-carbon material.

According to various embodiments, a positive electrode tab 510 may be disposed at one end of the positive electrode 511 to protrude from the edge of the positive electrode 511, and a negative electrode tab 520 may be disposed at one end of the negative electrode 521 to protrude the edge of the negative electrode 521. The positive electrode tab 510 and the negative electrode tab 520 may protrude from the same edge when the positive electrode 511 and the negative electrode 521 are disposed to overlap each other. The positive electrode tab 510 and the negative electrode tab 520 may be positioned adjacent to each other in the state in which the electrode assembly 500 is wound.

According to various embodiments, the first separator 541 and the second separator 542 are disposed between the positive electrode 511 and the negative electrode 521 to prevent short circuit that may occur between the positive electrode 511 and the negative electrode 521. In addition, the first separator 541 and the second separator 542 makes it possible to secure adhesion between the positive electrode 511 and the negative electrode 521 while being used as a passage for electrolyte ions.

According to various embodiments, the first separator 541 is disposed between the positive electrode 511 and the negative electrode 521 and blocks physical contact between one surface of the positive electrode 511 and one surface of the negative electrode 521. Thus, it is possible to prevent short circuit between the one surface of the positive electrode 511 and the one surface of the negative electrode 521. According to various embodiments, the second separator 542 may be disposed on the other surface of the positive electrode 511 or the other surface of the negative electrode 521. When the electrode assembly 500 is wound, the second separator 542 may be disposed between the other surface of the positive electrode 511 and the other surface of the negative electrode 521. The second separator 542 is capable of preventing short circuit between the other surface of the positive electrode 511 and the other surface of the negative electrode 521.

According to various embodiments, the first separator 541 and the second separator 542 may include at least one of polyethylene (PE) and polypropylene (PP). For example, the first separator 541 and the second separator 542 may include a single layer including polyethylene (PE) or a layer made of polypropylene (PP) as a substrate. A binder layer, a ceramic layer, or a combination thereof may be formed on opposite surfaces of the substrate layer of each of the first and second separators 541 and 542. The binder may include various materials capable of implementing adhesion between the positive electrode 511 and the negative electrode 521.

According to various embodiments, the first separator 541 and the second separator 542 may be made of a porous material. The first separator 541 and the second separator 542 may allow ions included in the electrolyte to move through fine holes formed therein. Charges or electrons may move between the positive electrode 511 and the negative electrode 521 due to the movement of ions.

The electrolyte may be injected into the pouch (the pouch 450 in FIG. 4), and may be disposed inside the pouch 450 together with the electrode assembly 500. The electrolyte is a medium for chemically balancing oxidation and reduction reactions occurring in the positive electrode 511 or the negative electrode 521, and may include a liquid, a solid, or a semisolid material such as a gel. For example, during charging, by oxidation of the positive electrode 511 and reduction of the negative electrode 521, lithium ions are capable of coming out of the positive electrode 511 and moving to the negative electrode 521 through the electrolyte, and electrons are capable of flowing from the positive electrode 511 to the negative electrode 521 along a circuit (e.g., the power management module 188 in FIG. 2) connected to the positive electrode tab 510 and the negative electrode tab 520. For example, during discharging of the battery 350, by reduction of the positive electrode 511 and oxidation of the negative electrode 521, lithium ions are capable of coming out of the negative electrode 521 and moving to the positive electrode 521 through the electrolyte, and electrons are capable of flowing from the negative electrode 521 to the positive electrode 511 along the circuit (e.g., the power management module 188 in FIG. 2) connected to the positive electrode tab 510 and the negative electrode tab 520. During the discharging, it is possible to convert the chemical energy possessed by the positive electrode active material of the positive electrode 511, the negative active material of the negative electrode 521, and the electrolyte into electrical energy, and to supply power to a corresponding circuit (e.g., the power management module 188 in FIG. 2) through the positive electrode tab 510 connected to the positive electrode 511 and the negative electrode tab 520 connected to the negative electrode 521.

According to various embodiments, the first separator 541 or the second separator 542 may extend to be longer than the positive electrode 511 and the negative electrode 521. The first separator 541 may include an adhesive layer on at least one surface of the extension. The surface of the extension of the first separator 541 to come into contact with the positive electrode 511 may include a binder layer or an adhesive layer, and may be bonded to the positive electrode 511 by the binder layer or the adhesive layer. The other surface of the extension of the first separator 541 may be a surface to come into contact with the pouch (e.g., the pouch 450 in FIG. 4), and may be made of an adhesive layer. The adhesive layer may be applied on the binder layer, and an adhesive layer may be provided in place of the binder layer. The electrode assembly 500 may be bonded to the inner surface of the pouch 450 by the adhesive layer. The extension of the first separator 541 may have a length sufficient to be wound once around the outer surface of the electrode assembly 500. For example, the extension of the first separator 541 may extend to a length corresponding to at least twice the sum of the length wound on the flat surfaces of the electrode assembly 500 (e.g., the flat surfaces 401 of FIG. 4) and the length wound on the curved surfaces of the electrode assembly 500 (e.g., the curved surfaces 402 in FIG. 4).

Figure 6:
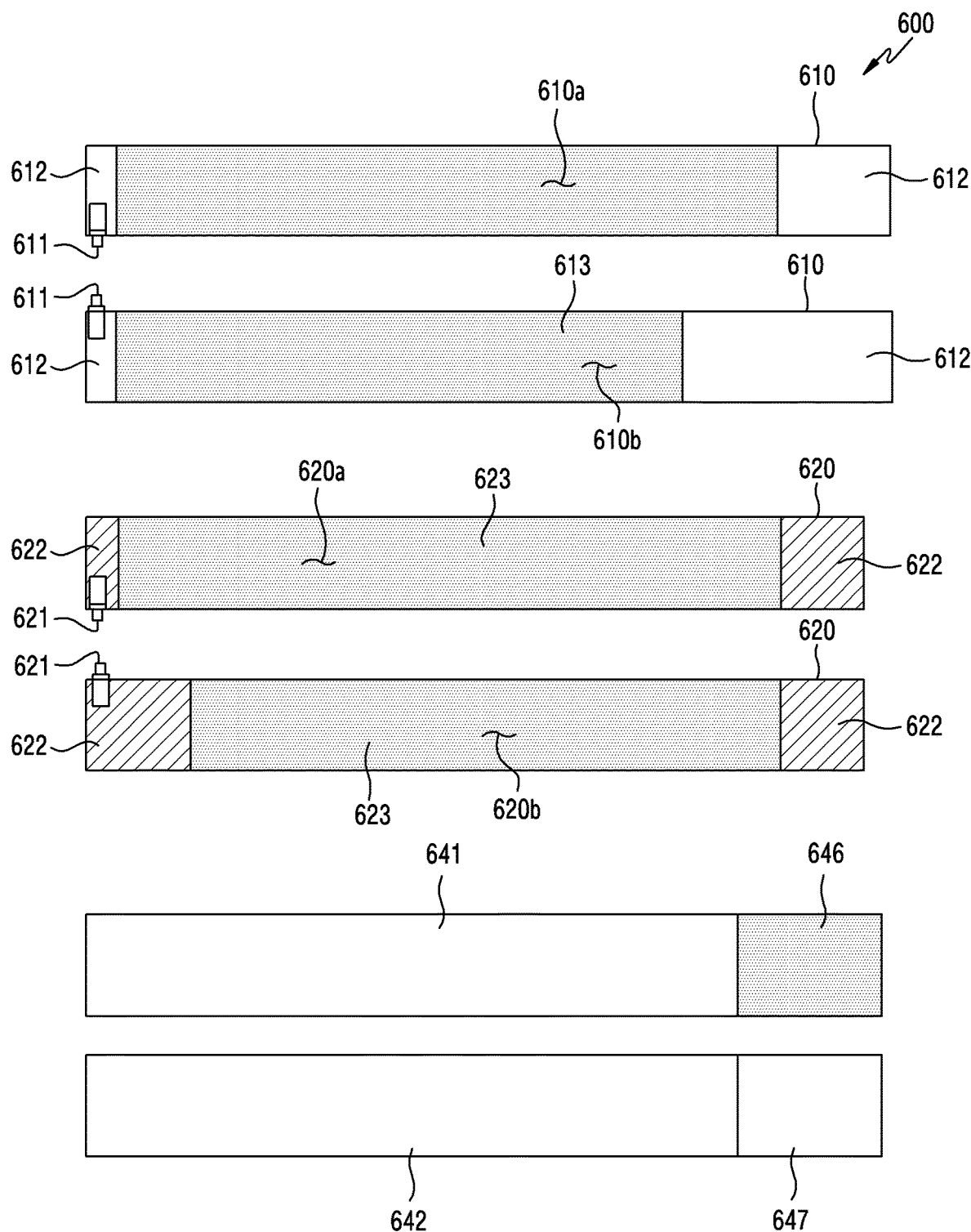
FIG. 6 is an exploded view of the battery of FIG. 4.

FIG. 6 is an exploded view of the battery of FIG. 4.

Referring to FIG. 6, an electrode assembly 600 may be an assembly of a positive electrode 610, a negative electrode 620, and a first separator 641 or a second separator 642. The positive electrode 610 and the negative electrode 620 may be disposed such that the positive electrode tab 611 and the negative electrode tab 621 protrude in one of the width directions. For example, the positive electrode tab 611 and the negative electrode tab 621 may protrude respectively from the peripheries of one ends of the positive electrode 610 and the negative electrode 620 in a direction perpendicular to the direction in which the positive electrode 610 and the negative electrode 620 are wound. When the electrode assembly 600 is wound and completed, the positive electrode 610 and the negative electrode 620 may be exposed to one surface of the electrode assembly.

According to various embodiments, when assembling the electrode assembly 600, the first separator 641 may be disposed between one surface of the positive electrode 610 and one surface of the negative electrode 620. The second separator 642 may be disposed on the other surface of the negative electrode 620. For example, sequentially, the second separator 642 may be prepared, the negative electrode 620 may be disposed on the second separator 642, the first separator 641 may be disposed on the negative electrode 620, and the positive electrode 610 may be disposed on the first separator 641. The electrode assembly 600 may be formed by winding the positive electrode 610, the first separator 641, the negative electrode 620, and the second separator 642, which are sequentially stacked.

According to various embodiments, the positive electrode 610 may include a positive electrode substrate 612, a positive electrode coating layer 613 coated on the surface of the positive electrode substrate 612, and a positive electrode tab 611. The positive electrode substrate 612 may be made of a flexible material, and the positive electrode substrate 612 may be a plate or layer (e.g., an aluminum foil) including a metal such as aluminum. The positive electrode coating layer 613 may include a positive electrode active material, a conductive agent, or a binder coated on a surface of the positive electrode substrate, and the battery capacity and voltage may be determined by the positive electrode 610. The positive electrode 610 may include a coated region in which the positive electrode coating layer 613 is coated on the positive electrode substrate 612 and an uncoated region in which the positive electrode coating layer 613 is not coated. The region in which the positive electrode coating layer 613 is coated on a first surface 610*a* of the positive electrode substrate 612 and the region in which the positive electrode coating layer 613 is coated on a second surface 610*b* may be coated differently. For example, the coated regions may include regions coated with the positive electrode coating layer 613 on opposite surfaces of the positive electrode substrate 612 or a region coated with the positive electrode coating layer 613 only on the first surface 610*a* of the positive electrode substrate 612. The region coated on only the first surface 610*a* of the positive electrode substrate 612 may have a length corresponding to about half a turn of the outer surface when the electrode assembly 600 is wound.

According to various embodiments, the negative electrode 620 may include a negative electrode substrate 622, a negative electrode coating layer 623 coated on the surface of the negative electrode substrate 622, and a negative electrode tab 621. The negative electrode substrate 622 may be made of a flexible material, and may be a plate or layer (e.g., a copper foil) including a metal such as copper. The negative electrode coating layer 623 may include a negative electrode active material, a conductive agent, or a binder coated on the surface of the negative electrode substrate. The negative electrode 620 may include a region in which the negative electrode coating layer 623 is coated on the negative electrode substrate 622 and an uncoated region in which the negative electrode coating layer 623 is not coated. The region in which the negative electrode coating layer 623 is coated on a first surface 620*a* of the negative electrode substrate 622 and the region in which the negative electrode coating layer 623 is coated on a second surface 620*b* may be coated differently. For example, the coated regions may include regions coated with the negative electrode coating layer 623 on opposite surfaces of the negative electrode substrate 622 or a region coated with the negative electrode coating layer 623 only on the first surface 620*a* of the negative electrode substrate 622. Unlike the positive electrode 610, the negative electrode 620 may have a region, which is not coated with the coating layer 623 on the second surface 620*b*, in a region adjacent to the negative electrode tab 621. According to various embodiments, the first separator 641 and the second separator 642 may be longer than the positive electrode 610 and the negative electrode 620. The first and second separators 641 and 642 may be wider than the positive electrode 610 and the negative electrode 620. The first separator 641 and the second separator 642 may have a length and width sufficient for preventing contact between the positive electrode 610 and the negative electrode 620.

According to various embodiments, an adhesive layer 646 may be applied to a region exposed since the first separator 641 is longer than the positive electrode 610 and the negative electrode 620. The adhesive layer may have a thickness of 56 μm or less, which is the minimum thickness capable of implementing an adhesive force. The adhesive layer 646 of the first separator 641 may be the outermost surface when the electrode assembly 600 is wound, and the electrode assembly 600 and the pouch (e.g., the pouch 450 in FIG. 4) may be bonded to each other. The first separator 641 has a surface rougher than the surface of a metal foil (e.g., an aluminum foil) that is the substrate material of the positive electrode 610. Thus, the first separator 641 is suitable for applying an adhesive layer thereto, which makes it possible to use the adhesive layer applied to the first separator 641 instead of a separate adhesive member (e.g., tape), and thus makes it easy to secure the capacity of the electrode assembly. In addition, since the outermost portion of the electrode assembly 600 is finished with the first separator 641, it is possible to prevent short circuit due to damage that may occur between the electrode assembly 600 and the pouch (e.g., the pouch 450 in FIG. 4).

According to various embodiments, the second separator 642 may be longer than the positive electrode 610 and the negative electrode 620. The material of the extension area 647 may be the same as the material of the remaining area. The length of the second separator 642 may be longer than those of the positive electrode 610 and the negative electrode 620, and may be substantially equal to the length of the first separator 641. According to another embodiment, the length of the second separator 642 may be shorter than the length of the first separator 641. For example, the second separator 642 may be a length sufficient to prevent contact between the positive electrode 610 and the negative electrode 620.

Figure 7A:
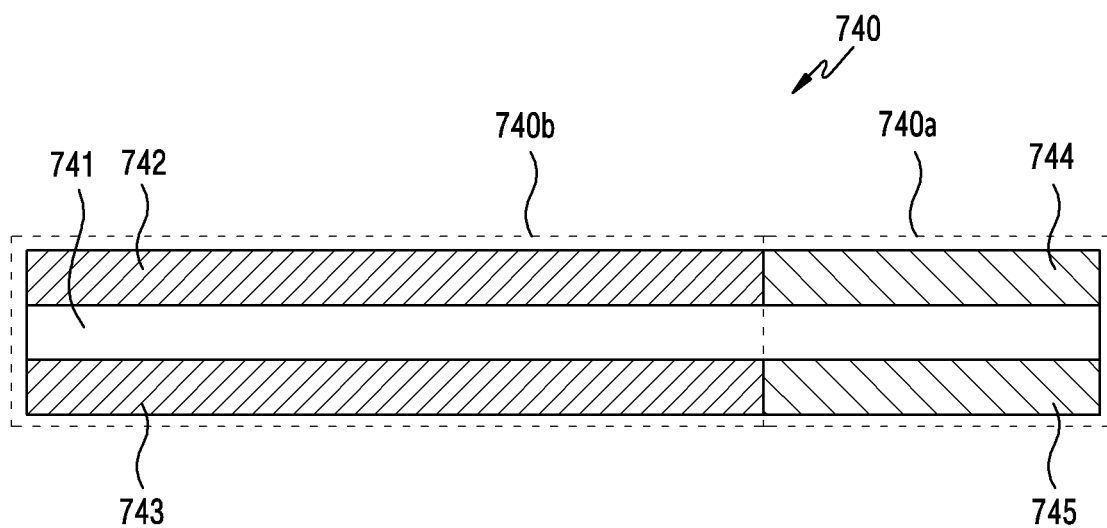
FIG. 7A is a cross-sectional view of a separator of an electrode assembly according to an embodiment.
Figure 7B:
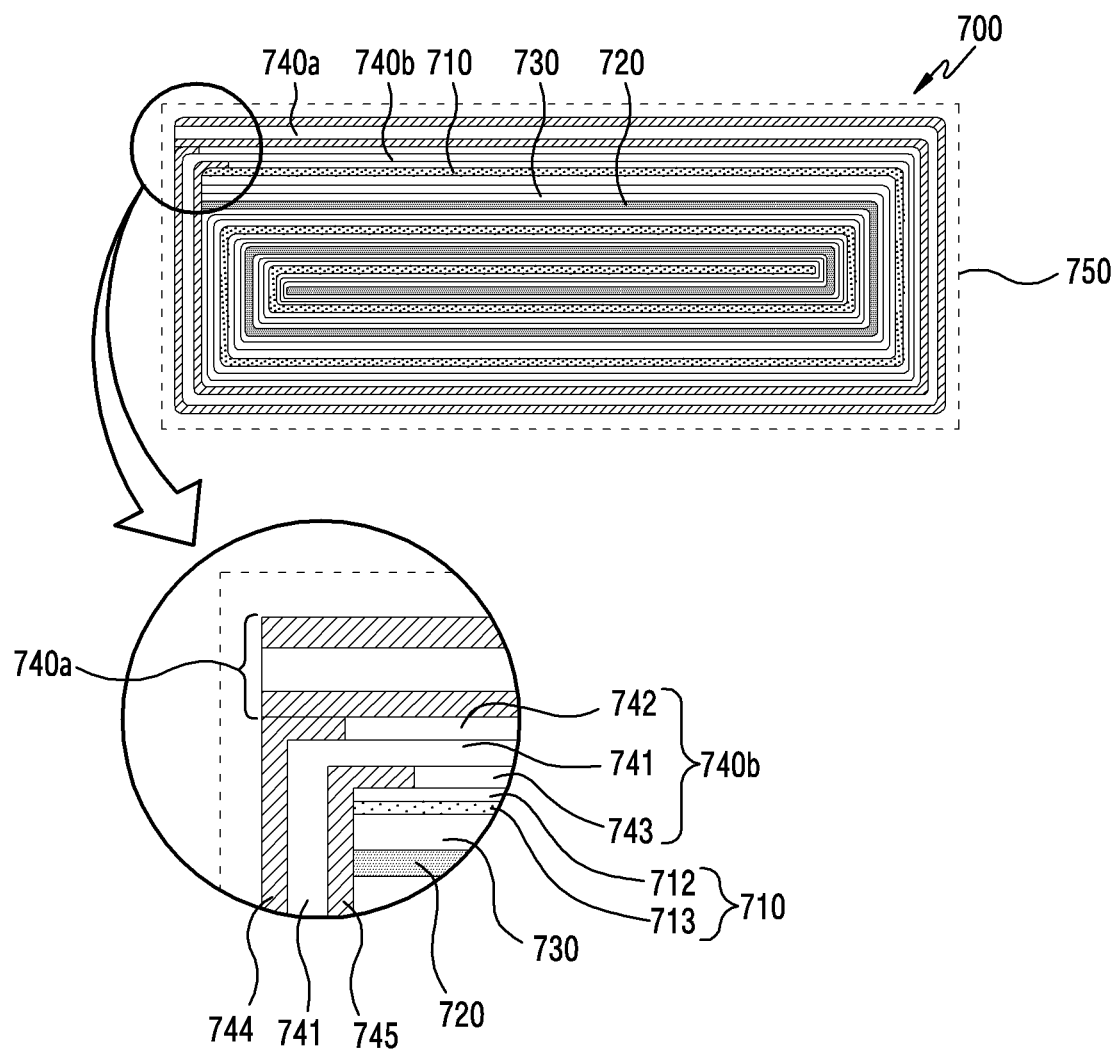
FIG. 7B is a cross-sectional view of an electrode assembly according to an embodiment.

FIG. 7A is a cross-sectional view of a separator of an electrode assembly according to an embodiment, and FIG. 7B is a cross-sectional view of an electrode assembly according to an embodiment.

Referring to FIGS. 7A and 7B, a separator 740 may include a substrate layer 741, a first coating layer 742, a second coating layer 743, a first adhesive layer 744, or a second adhesive layer 745. The second coating layer 743 may be formed inside a jelly roll. The second coating layer 743 may be a binder, ceramic, or a combination thereof applied on the substrate layer. The second coating layer 743 may be coated on opposite surfaces of the substrate. The first coating layer 742 may be disposed outside the jelly roll.

According to various embodiments, the separator 740 may include a first region 740a and a second region 740b. The second region 740b in which the first coating layer 742 and the second coating layer 743 are applied to the substrate layer 741 may be a region overlapping the positive electrode plate and the negative electrode plate. The first region 740a in which the first adhesive layer 744 and the second adhesive layer 745 are applied to the substrate layer 741 may be a region extending from an edge of the positive electrode or the negative electrode.

According to various embodiments, the substrate layer 741 may include at least one of polyethylene (PE) or polypropylene (PP). The first coating layer 742 and the second coating layer 743 may include a binder or ceramic. The first coating layer 742 and the second coating layer 743 may be made of an adhesive or sticky material such that the positive electrode (e.g., the positive electrode 610 in FIG. 6) and the negative electrode (e.g., the negative electrode 620 in FIG. 6) can be attached to the substrate layer 741. For example, the first coating layer 742 and the second coating layer 743 may be polyvinylidene fluoride (PVDF) films including a fluoropolymer material such as PVDF.

According to various embodiments, the first separator 730 and the second separator 740 may be insulators, and may insulate the positive electrode 710 and the negative electrode 720. The second separator 740 may define the outer surface of the electrode assembly so as to prevent damage to the positive electrode 710, and may insulate the positive electrode 710 and the pouch 750 from each other.

According to various embodiments, the first adhesive layer 744 may define the outermost surface of the electrode assembly (e.g., the electrode assembly 600 in FIG. 6). The first adhesive layer 744 may have an adhesive force capable of attaching the substrate layer 741 and the inner surface of the pouch (e.g., the pouch 450 in FIG. 4) to each other. The substrate layer 741 may have a surface rougher than the aluminum foil forming the positive electrode. The substrate layer 741 having the rough surface may facilitate application of an adhesive layer. The first adhesive layer 744 applied to the substrate layer 741 may have an adhesive force greater than that obtained in the case in which the outer surface of the electrode assembly is provided as a positive electrode and the coating layer is coated thereon.

According to various embodiments, the second adhesive layer 745 may be coated on a surface of the substrate layer 741 opposite to the surface on which the first adhesive layer 744 is coated. The second adhesive layer 745 may allow the substrate layer 741 and the positive electrode (e.g., the positive electrode 610 in FIG. 6) to be attached to each other.

According to various embodiments, the first adhesive layer 744 and the second adhesive layer 745 may be made of a polymer material used for tape. For example, the first adhesive layer 744 and the second adhesive layer 745 may be a polymer that has an adhesive force when exposed to heat or pressure, such as oriented polystyrene (OPS).

According to various embodiments, the thickness of the separator 740 in the first region 740a and the thickness of the separator 740 in the second region 740b may be equal to each other, and in order to reduce the thickness obtained through the application of the first adhesive layer 744 and the second adhesive layer 745, the first coating layer 742 and the second coating layer 743 may not be coated in the first region 740a.

According to various embodiments, the first adhesive layer 744 may be provided as a portion of the separation film, and the first adhesive layer 744 may be provided in the substrate layer 741 of the first region 740a through pattern coating. The second adhesive layer 745 may also be provided on the surface opposite to the surface, on which the first adhesive layer 744 is provided, by being pattern-coated using the same method. The pattern-coated lengths of the first adhesive layer 744 and the second adhesive layer 745 may be at least twice the sum of the width and thickness of the electrode assembly. For example, the first adhesive layer 744 may have a length sufficient to surround the entire outer surface of the electrode assembly. The separator provided with the first adhesive layer 744 and the second adhesive layer 745 may be coated on the first region 740a of the substrate layer 741 of the separator 740 through a method such as slot die coating, dip coating, or electrospinning during the manufacturing process of the separator.

Referring to FIG. 7B, the battery 700 may include a pouch 750 and an electrode assembly disposed in the inner space of the pouch 750.

According to various embodiments, the electrode assembly may include a positive electrode 710, a first separator 730, a negative electrode 720, and a second separator having first and second regions 740a and 740b. The positive electrode 710, the first separator 730, the negative electrode 720, and a second region 740b of the second separator may be stacked and wound from the center of the electrode assembly so as to form an assembly. A first region 740a of the second separator may extend from the ends of the positive electrode 710 and the negative electrode 720 to surround the outer surface of the electrode assembly at least once.

According to various embodiments, a partial region of the positive electrode 710 wrapped by the first region 740a of the second separator may include a positive electrode coating layer 713 (e.g., the positive electrode coating layer 613 in FIG. 6) provided on a first surface (e.g., the first surface 610a in FIG. 6) of the positive electrode substrate 712. The positive electrode coating layer 713 may be provided to be in contact with the second separator 730. The first adhesive layer 744 provided on the outer surface of the jelly roll of the first region 740a may be attached to the pouch 750. By uniformly coating the first adhesive layer 744 on the substrate layer 741 in the first region 740a, it is possible to uniformly maintain the adhesive force with the pouch 750. Therefore, it is possible to maintain the adhesive properties in the curved surfaces or the flat surfaces of the electrode assembly to be the same, and to reduce the damage to the pouch by reducing the occurrence of slip at the boundary between curved surface portions. Since a separate finishing tape is not required, it is possible to reduce the volume by the thickness of the finishing tape, and thus to increase the capacity of the battery 700. Each of the first adhesive layer 744 and the second adhesive layer 745 may have a thickness of about 56 µm or less.

According to various embodiments, the first separator 730 may be made of the same material as the material of the second region 740b of the second separator 740. The first separator 730 may have a length corresponding to the positive electrode 710 and the negative electrode 720, and may extend from the edges of the positive electrode 710 and the negative electrode 720.

Figure 8A:
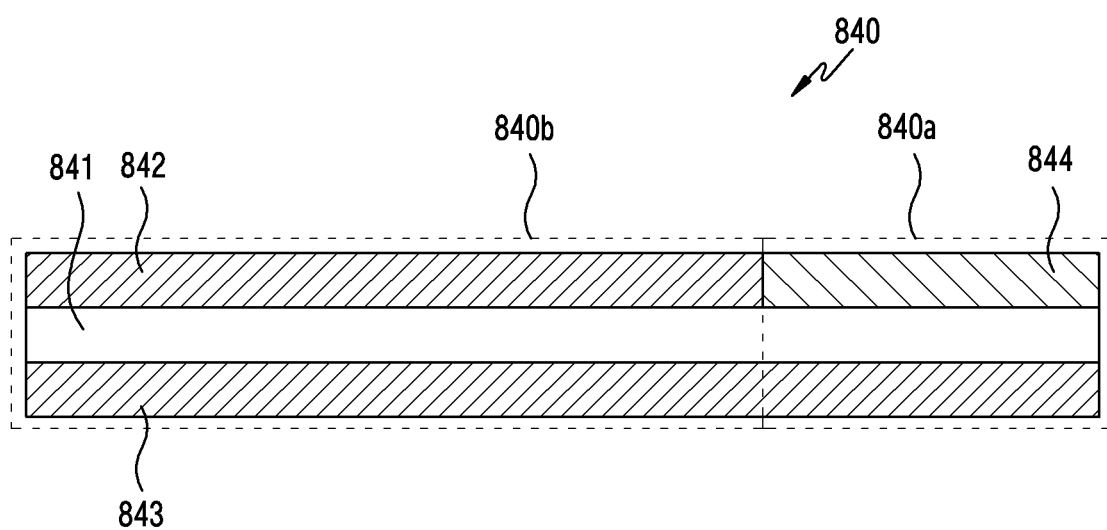
FIG. 8A is a cross-sectional view of a separator of an electrode assembly according to another embodiment.
Figure 8B:
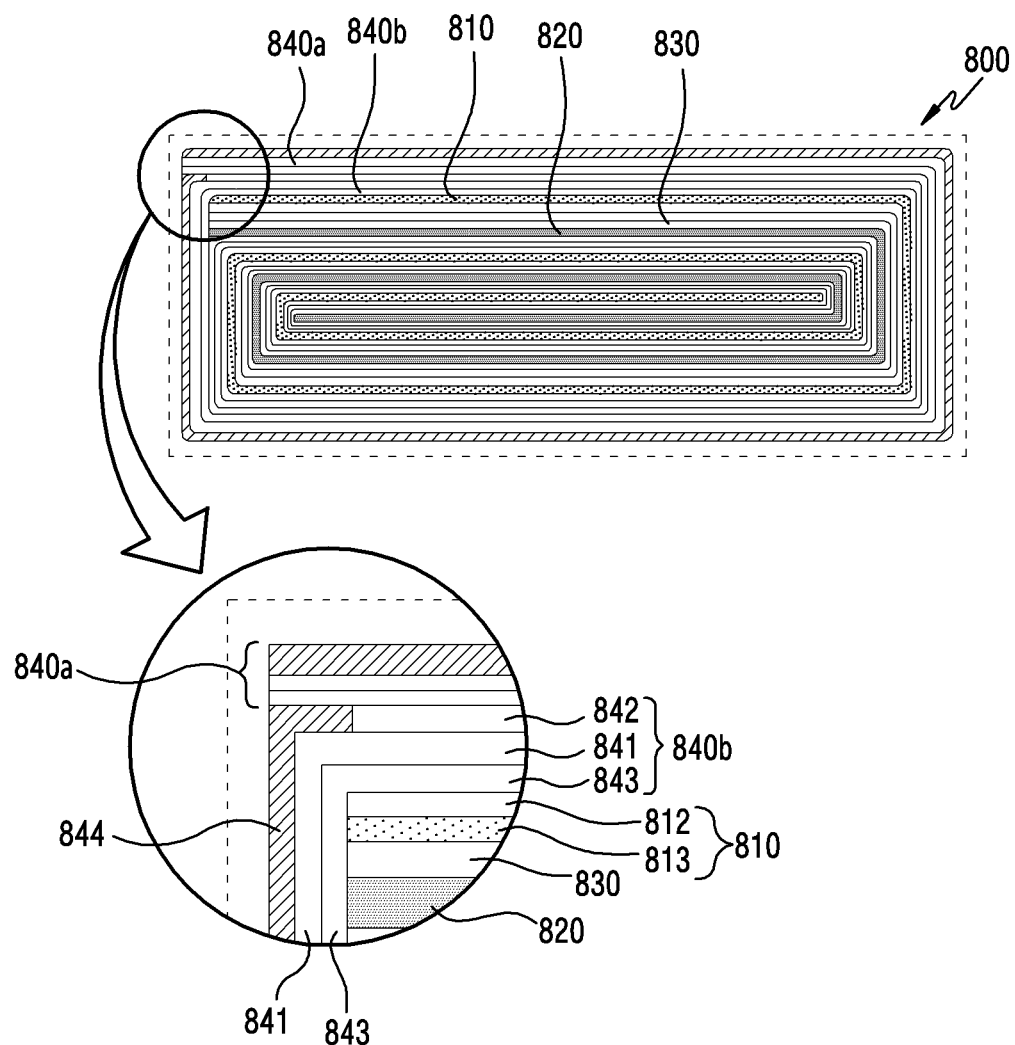
FIG. 8B is a cross-sectional view of an electrode assembly according to another embodiment.

FIG. 8A is a cross-sectional view of a separator of an electrode assembly according to another embodiment, and FIG. 8B is a cross-sectional view of an electrode assembly according to another embodiment.

Referring to FIGS. 8A and 8B, a separator 840 may include a substrate layer 841, a first coating layer 842, a second coating layer 843, or a first adhesive layer 844. According to various embodiments, the electrode assembly may include a positive electrode 810, a first separator 830, a negative electrode 820, and a second separator including a first region 840a and a second region 840b. The positive electrode 810, the first separator 830, the negative electrode 820, and a second region 840b of the second separator may be stacked and wound from the center of the electrode assembly so as to form an assembly. A first region 840a of the second separator may extend from the ends of the positive electrode 810 and the negative electrode 820 to surround the outer surface of the electrode assembly at least once.

According to an embodiment, the second separator 840 defining the outermost surface of the electrode assembly may include a first region 840a and a second region 840b. The second region 840b in which the first coating layer 842 and the second coating layer 843 are applied to the substrate layer 841 may be a region overlapping the positive electrode and the negative electrode. The first region 840a in which the first adhesive layer 844 is applied to the substrate layer 841 may be a region extending from an edge of the positive electrode or the negative electrode.

According to various embodiments, the substrate layer 841 may include at least one of polyethylene (PE) or polypropylene (PP). The first coating layer 842 and the second coating layer 843 may include a binder or ceramic. For example, the first coating layer 842 and the second coating layer 843 may be polyvinylidene fluoride (PVDF) films including a fluoropolymer material such as PVDF.

According to various embodiments, the first adhesive layer 844 may define the outermost surface of the electrode assembly (e.g., the electrode assembly 600 in FIG. 6). The first adhesive layer 844 may have an adhesive force capable of attaching the substrate layer 841 and the inner surface of the pouch 850 to each other. The substrate layer 841 may have a surface rougher than the aluminum foil forming the positive electrode. The substrate layer 841 having the rough surface may facilitate application of an adhesive layer. The first adhesive layer 844 applied to the substrate layer 841 may have an adhesive force greater than that obtained in the case in which the outer surface of the electrode assembly is provided as a positive electrode and the coating layer is coated thereon.

The adhesive force between the second coating layer 843 and the positive electrode plate 810 may be weaker than the adhesive force between the adhesive layer 844 and the inside of the pouch 850. According to an embodiment, the separator 840 may be made of a polymer material, and may be more flexible than the positive electrode 810. Thus, the adhesive force for fixing between the positive electrode 810 and the separator 840 may be sufficient.

According to various embodiments, the second coating layer 843 coated in the second region 840b may extend on the surface of the substrate layer 841 opposite to the surface on which the first adhesive layer 844 is coated.

According to various embodiments, the first adhesive layer 844 may be made of a polymer material used for tape. For example, the first adhesive layer 844 may be a polymer that has an adhesive force when exposed to heat or pressure, such as oriented polystyrene (OPS).

According to various embodiments, the first adhesive layer 844 may be provided as a portion of the separation film, and the first adhesive layer 844 may be provided in the first region 840a of the substrate layer 841 through pattern coating. The pattern-coated length of the first adhesive layer 844 may be at least twice the sum of the width and thickness of the electrode assembly. For example, the first adhesive layer 844 may have a length sufficient to surround the entire outer surface of the electrode assembly. The separator provided with the first adhesive layer 844 may be coated on the outer surface of the first region 840a of the substrate layer 841 of the separator 840 through a method such as slot die coating, dip coating, or electrospinning during the manufacturing process of the separator.

According to various embodiments, a partial region of the positive electrode 810 wrapped by the first region 840a of the second separator may include a positive electrode coating layer 813 (e.g., the positive electrode coating layer 613 in FIG. 6) provided in a first surface (e.g., the first surface 610a in FIG. 6) of the positive electrode substrate 812. The positive electrode coating layer 813 may be provided to be in contact with the second separator 830.

According to various embodiments, the first region 840a of the second separator may extend from ends of the positive electrode 810 and the negative electrode 820 to surround the outer surface of the electrode assembly at least once. The first adhesive layer 844 provided on the outer surface of the jelly roll of the first region 840a may be attached to the pouch 850. By uniformly coating the first adhesive layer 844 on the substrate layer 841 in the first region 840a, it is possible to maintain the adhesive force with the pouch 850 uniformly.

Figure 9A:
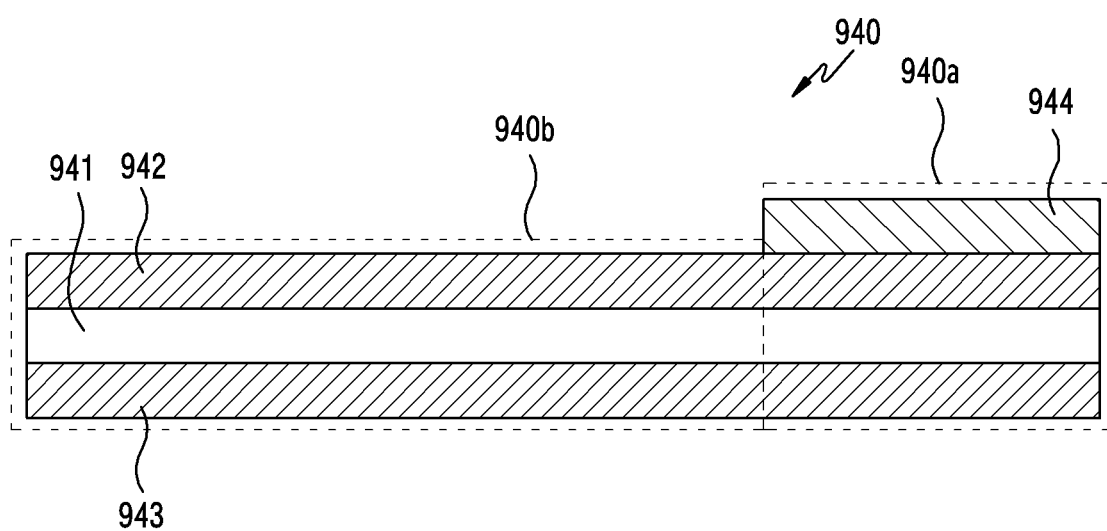
FIG. 9A is a cross-sectional view of a separator of an electrode assembly according to still another embodiment.
Figure 9B:
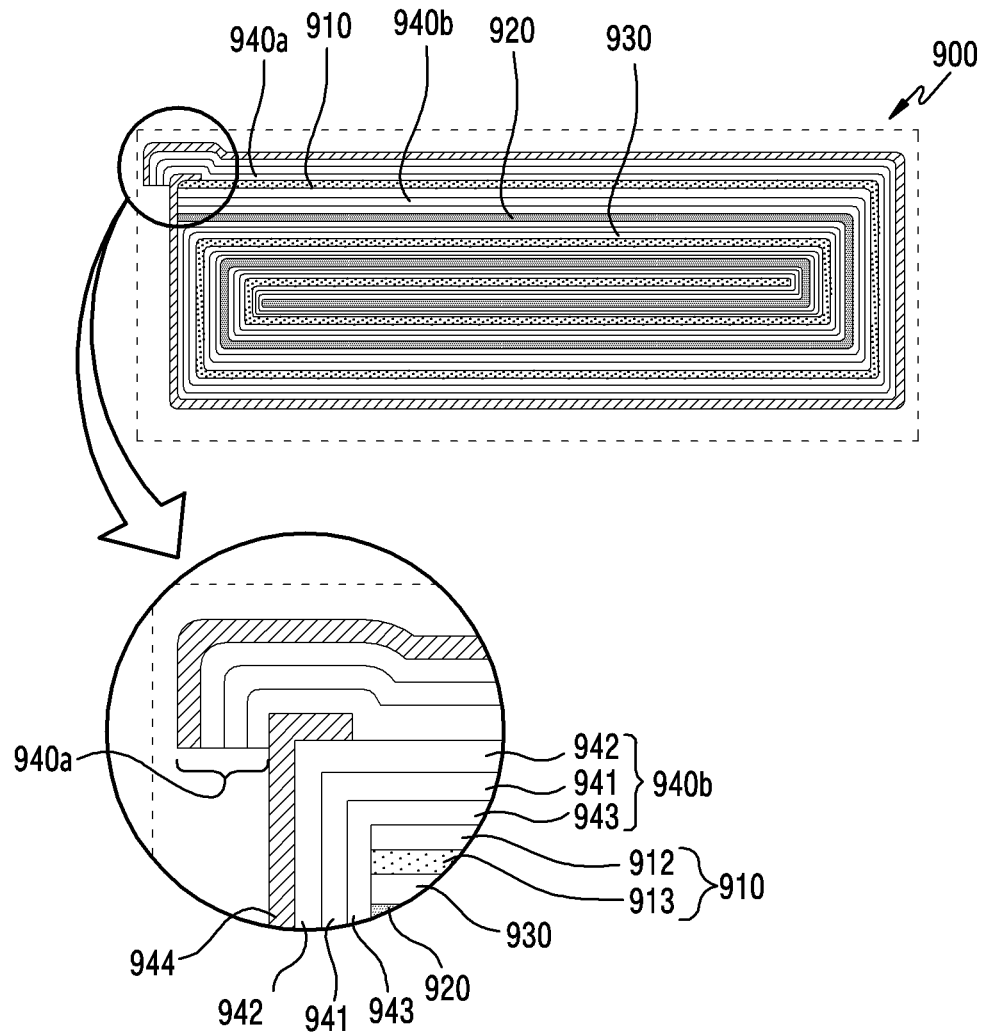
FIG. 9B is a cross-sectional view of an electrode assembly according to still another embodiment.

FIG. 9A is a cross-sectional view of a separator of an electrode assembly according to still another embodiment, and FIG. 9B is a cross-sectional view of an electrode assembly according to still another embodiment.

Referring to FIGS. 9A and 9B, a separator 940 may include a substrate layer 941, a first coating layer 942, a second coating layer 943, or a first adhesive layer 944. According to various embodiments, the electrode assembly may include a positive electrode 910, a first separator 930, a negative electrode 920, and a second separator including a first region 940a and a second region 940b. The positive electrode 910, the first separator 930, the negative electrode 920, and a second region 940b of the second separator may be stacked and wound from the center of the electrode assembly so as to form an assembly. A first region 940a of the second separator may extend from the ends of the positive electrode 910 and the negative electrode 920 to surround the outer surface of the electrode assembly at least once.

According to various embodiments, the second separators 940a and 940b defining the outermost surface of the electrode assembly may be wrap the outer surface of the electrode assembly. The second separator 940 may include a first region 940a and a second region 940b. In the second separator 940, a first coating layer 942 and a second coating layer 943 may be provided on opposite surfaces of the substrate layer 941. The first coating layer 942 may be disposed inside the jelly roll, and the second coating layer 943 may be disposed outside the jelly roll. The substrate layer 941 may include at least one of polyethylene (PE) or polypropylene (PP). The first coating layer 942 and the second coating layer 943 may include a binder or ceramic. The first coating layer 942 and the second coating layer 943 may be made of an adhesive or sticky material such that the positive electrode 910 and the negative electrode 920 can be attached to the substrate layer 941. For example, the first coating layer 942 and the second coating layer 943 may be polyvinylidene fluoride (PVDF) films including a fluoropolymer material such as PVDF. According to various embodiments, the first separator 930 may include the substrate layer 941, the first coating layer 942, and the second coating layer 943 of the second separator 940, and the stacked structure may be the same as or similar to the second separator 940.

According to various embodiments, the second separator 940 may include a first region 940a and a second region 940b. The second region 940b may be a region that may overlap the positive electrode 910 and the negative electrode 930, and the first region 940a may be a region extending from the positive electrode 910 or the negative electrode 930. An adhesive layer 944 may be provided on the surface of the second separator 940 disposed in the first region 940a. The adhesive layer 944 may define the outermost surface of the electrode separation body. The length of the first region 940a may have a length sufficient to wrap the outermost surface of the electrode separation body. For example, the length of the first region 940a may be at least twice the sum of the width and thickness of the electrode separation body so as to be longer than the length of the circumference of the electrode separation body. The region of the second separator 940 wound in the outermost area once may be the first region 940a, and the adhesive layer 944 may be coated on the corresponding portion so as to attach the pouch 950 and the second separator 940 to each other.

According to various embodiments, a partial region of the positive electrode 910 wrapped by the first region 940a of the second separator may include a positive electrode coating layer 913 (e.g., the positive electrode coating layer 613 in FIG. 6) provided on a first surface (e.g., the first surface 610a in FIG. 6) of the positive electrode substrate 912. The positive electrode coating layer 913 may be provided to be in contact with the second separator 930.

According to various embodiments, by providing the adhesive layer 944 on the outer surface of the first coating layer 942, it is possible to prevent distortion of the electrode assembly due to a difference in volume due to heat shrinkage that may occur when the adhesive layer 944 is provided on the same layer. The adhesive layer may have a thickness of 56 μm or less, which is the minimum thickness capable of implementing an adhesive force. In a separator manufacturing process, the adhesive layer 944 may be additionally coated. The adhesive layer 944 may be long enough to cover the outermost portion of the electrode assembly, and may be coated through slot die coating, dip coating, electrospinning, or the like.

According to various embodiments, the adhesive layer 944 may be provided after winding of the electrode assembly is completed. When the first separator 940a wraps the outer surface of the electrode assembly before removing a core from the center of the electrode assembly in a winding operation, the adhesive layer 944 may be provided in various ways such as spraying, dot coating, and patterning of an adhesive material on the exposed surface of the first separator 940a.

A battery (e.g., the battery 400 in FIG. 4) may include: an electrode assembly (e.g., the electrode assembly 430 or 500 in FIG. 4 or FIG. 5) including a positive electrode (e.g., the positive electrode 511 in FIG. 5) including a positive electrode tab (e.g., the positive electrode tab 410 or 510 in FIG. 4 or FIG. 5) provided at one end; a negative electrode (e.g., the negative electrode 521 in FIG. 5) disposed on one surface of the positive electrode and including a negative electrode tab (e.g., the negative electrode tab 420 or 520 in FIG. 4 or FIG. 5) provided at one end, a first separator (e.g., the first separator 541 in FIG. 5) disposed between the positive electrode and the negative electrode to separate the positive electrode from the negative electrode and including an extension extending from another end of the positive electrode or the negative electrode, and a second separator (e.g., the second separator 542 in FIG. 5) having one surface disposed on another surface of the positive electrode or the negative electrode; and a pouch (e.g., the pouch 450 in FIG. 4) wrapping the electrode assembly. The positive electrode, the negative electrode, the first separator, and the second separator may be wound so that the extension of the first separator is exposed to the outside, and an exposed surface of the extension may be configured as an adhesive layer (e.g., the adhesive layer 646 in FIG. 6).

According to various embodiments, the extension may define an outer surface of the electrode assembly, and the extension and the pouch may be coupled to each other by the adhesive layer.

According to various embodiments, the first separator or the second separator may include a base film (e.g., the base film 741 in FIG. 7A) and a binder (e.g., the first coating layer 742 or the second coating layer 743 in FIG. 7A) formed on each of the opposite surfaces of the base film, the base film may extend in the extension, and the extension may include the adhesive layer on one surface of the base film.

According to various embodiments, the extension may include an additional adhesive layer on the other surface of the base film, and the additional adhesive layer may bond the base film to the positive electrode or the negative electrode.

According to various embodiments, the extension may have a thickness that is substantially equal to a thickness of the first separator.

According to various embodiments, the first separator or the second separator may include a base film and a binder provided on each of opposite surfaces of the base film, the base film and the binder may extend in the extension of the first separator, and the adhesive layer may be laminated on the binder provided on one surface of the base extension.

According to various embodiments, an additional adhesive layer may be laminated on the binder applied to the other surface of the base film of the first separator, and the additional adhesive layer bonds the base film to the positive electrode or the negative electrode.

According to various embodiments, the extension may have a thickness that is different from the thickness of a remainder of the first separator.

According to various embodiments, the additional coating layer may be laminated on the binder after the separator is coated on the positive electrode.

According to various embodiments, the extension may be wound at least once along a side surface of the assembly.

According to various embodiments, the first separator may be longer than the second separator.

According to various embodiments, the adhesive layer may have a thickness of 1 µm to 52 µm.

According to various embodiments, the first separator and the second separator may have an insulating material.

According to various embodiments, an adhesion force between the adhesive layer and the pouch may be substantially uniform.

An electronic device according to various embodiments may include: a housing defining an inner space therein; a battery including: an electrode assembly (e.g., the electrode assembly 430 or 500 in FIG. 4 or FIG. 5) including a positive electrode (e.g., the positive electrode 511 in FIG. 5) including a positive electrode tab provided at one end, a negative electrode (e.g., the negative electrode 521 in FIG. 5) disposed on one surface of the positive electrode and including a negative electrode tab provided at one end, a first separator (e.g., the first separator 541 in FIG. 5) disposed between the positive electrode and the negative electrode and separating the positive electrode from the negative electrode, and including an extension extending from another end of the positive electrode or the negative electrode, and a second separator (e.g., the second separator in FIG. 5) having one surface disposed on another surface of the positive electrode or the negative electrode, and a pouch (e.g., the pouch 450 in FIG. 4) wrapping the electrode assembly, the battery being disposed in the inner space; and a bracket (e.g., the support member 360 in FIG. 3) on which the battery is seated. The positive electrode, the negative electrode, the first separator, and the second separator may be wound so that the extension of the first separator is in contact with an inner surface of the pouch, and the first separator may be fixed to the pouch by an adhesive layer provided on an exposed surface of the extension.

According to various embodiments, the folded outer surface of the electrode assembly may be a curved surface, and the pouch may have a shape corresponding to the shape of the electrode assembly.

According to various embodiments, the first separator or the second separator may include a base film and a binder provided on each of opposite surfaces of the base film, the base film may extend in the extension, and the extension may include the adhesive layer on one surface of the base film.

According to various embodiments, the extension may include an additional adhesive layer on the other surface of the base film, and the additional adhesive layer may bond the base film to the positive electrode or the negative electrode.

According to various embodiments, the first separator may be longer than the second separator.

According to various embodiments, the first separator and the second separator may have an insulating material.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A battery comprising:
   an electrode assembly including:
      a positive electrode including a positive electrode tab provided at one end,
      a negative electrode disposed on one surface of the positive electrode and including a negative electrode tab provided at one end,
      a first separator disposed between the positive electrode and the negative electrode to separate the positive electrode from the negative electrode and including an extension extending from another end of the positive electrode or the negative electrode, and
      a second separator including one surface disposed on another surface of the positive electrode or the negative electrode; and
   a pouch wrapping the electrode assembly, wherein the positive electrode, the negative electrode, the first separator, and the second separator are wound so that the extension of the first separator is exposed to an outside, and
   an exposed surface of the extension is configured as an adhesive layer,
   wherein the first separator includes a base film and a binder disposed on both surfaces of the base film,
   wherein the adhesive layer is disposed on a portion of the base film included in the extension, and
   wherein the base film and the binder are wound such that the adhesive layer is attached to a terminal end of the binder at an interior of the electrode assembly, and terminates after winding to form an exterior surface of the electrode assembly.

2. The battery of claim 1, wherein the extension defines an outer surface of the electrode assembly, and the extension and the pouch are coupled to each other by the adhesive layer.

3. The battery of claim 1, wherein the extension includes an additional adhesive layer on another surface of the base film, and the additional adhesive layer bonds the base film to the positive electrode or the negative electrode.

4. The battery of claim 1, wherein the extension has a thickness that is substantially equal to a thickness of a remaining portion of the first separator excluding the extension from the first separator.

5. The battery of claim 1, wherein the first separator or the second separator includes a base film and a binder which is formed on both surfaces of the base film, and
wherein the base film and the binder extend in the extension of the first separator, and the adhesive layer is laminated on the binder provided on one surface of the extension of the base film.

6. The battery of claim 5, wherein an additional adhesive layer is laminated on the binder applied to another surface of the base film of the first separator, and the additional adhesive layer bonds the base film to the positive electrode or the negative electrode.

7. The battery of claim 5, wherein the extension has a thickness that is different from a thickness of a remaining portion of the first separator excluding the extension from the first separator.

8. The battery of claim 6, wherein the additional adhesive layer is laminated on the binder after the first separator is coated on the positive electrode.

9. The battery of claim 1, wherein the extension is wound at least once along a side surface of the electrode assembly.

10. The battery of claim 1, wherein the first separator is longer than the second separator.

11. The battery of claim 1, wherein the adhesive layer has a thickness of 1 μm to 56 μm.

12. The battery of claim 1, wherein each of the first separator and the second separator includes an insulation material.

13. The battery of claim 1, wherein an adhesion force between the adhesive layer and the pouch is substantially uniform.

14. An electronic device comprising:
a housing defining an inner space;
a battery including an electrode assembly including:
 a positive electrode including a positive electrode tab provided at one end,
 a negative electrode disposed on one surface of the positive electrode and including a negative electrode tab provided at one end,
 a first separator disposed between the positive electrode and the negative electrode to separate the positive electrode from the negative electrode and including an extension extending from another end of the positive electrode or the negative electrode, and
 a second separator including one surface disposed on another surface of the positive electrode or the negative electrode, and
 a pouch wrapping the electrode assembly, the battery being disposed in the inner space; and
a bracket on which the battery is seated,
wherein the positive electrode, the negative electrode, the first separator, and the second separator are wound so that the extension of the first separator is in contact with an inner surface of the pouch, and the first separator is fixed to the pouch by an adhesive layer provided on an exposed surface of the extension,
wherein the first separator includes a base film and a binder disposed on both surfaces of the base film, and
wherein the base film and the binder are wound such that the adhesive layer is attached to a terminal end of the binder at an interior of the electrode assembly, and terminates after winding to form an exterior surface of the electrode assembly.

* * * * *